Aug. 30, 1960  A. BOETTCHER ET AL  2,950,778
PROCESS AND APPARATUS FOR THE SEPARATION
OF MIXTURES IN THE GASEOUS STATE
Filed Oct. 5, 1956  3 Sheets-Sheet 1

INVENTORS
ALFRED BOETTCHER,
ROLF MANTEUFEL,

BY Bailey, Stephens & Huettig

ATTORNEYS

Aug. 30, 1960

A. BOETTCHER ET AL 2,950,778

PROCESS AND APPARATUS FOR THE SEPARATION
OF MIXTURES IN THE GASEOUS STATE

Filed Oct. 5, 1956

INVENTORS
ALFRED BOETTCHER,
ROLF MANTEUFEL,
BY Bailey, Stephens & Huettig
ATTORNEYS

United States Patent Office 2,950,778
Patented Aug. 30, 1960

2,950,778
PROCESS AND APPARATUS FOR THE SEPARATION OF MIXTURES IN THE GASEOUS STATE

Alfred Boettcher and Rolf Manteufel, both of Frankfurt am Main, Germany, assignors to Deutsche Gold- und Silber-Scheideanstalt vormals Roessler, Frankfurt am Main, Germany Filed Oct. 5, 1956, Ser. No. 614,184

Claims priority, application Germany Oct. 5, 1955

2 Claims. (Cl. 183—2)

The present invention relates to an improved process and apparatus for the separation of mixtures of gaseous or vaporous substances of different mass and/or different effective kinetic cross-section, making use of the different kinetic mobilities of the molecules or atoms to be separated. The process and apparatus according to the invention are particularly suitable for the separation of isotopes.

The present invention involves an improvement over the process and apparatus described in Becker application S.N. 563,387, filed February 3, 1956, now abandoned. In such prior application, a separation system is used in which the mixture to be separated is caused to issue with high velocity from a nozzle like opening in the form of an expanding jet and the latter is separated by an apertured baffle arranged across the path of its flow into a peripheral portion and a core portion which passes through the aperture in the baffle and the peripheral and core portions are collected separately. In such separation system the heavy components of the mixture concentrate in the core portion and the lighter components concentrate in the peripheral portion. It was found in the operation of such separation system that the maintenance of certain pressure ratios before and after the nozzle and also in front of and after the apertured baffle is of great significance. In general operation of such separation system the ratio of pressures before and after the nozzle opening is maintained between 100:1 and 1000:1, whereas with reference to the space behind the apertured baffle at most a similar pressure ratio must be maintained. Consequently, for practical operation of the separation system, pressures of about 10 to 20 mm. Hg are employed ahead of the nozzle and pressures of $10^{-2}$ to $10^{-1}$ in the spaces provided for the separated peripheral and core portions of the expanding jet stream.

In the modification of the separation process of application S.N. 563,387 as presently practiced, pumps are employed for the maintenance of the desired advantageous pressure ratios and conveying the gas or vapor streams through the separation system. For intensive separations and above all in concentration of isotopes, it is necessary to carry out the separation in a number of steps and in many instances many steps, that is, it is necessary to connect a number of nozzle and baffle containing separating elements in series. In such instance in interest of effecting the known optimum principles of operation the separated core portions and peripheral portions of the separation steps connected in series are combined in such a way that when combined they, as nearly as possible, have the same composition. In such mode of operation, a large number of high capacity pumps, that is, pumps of high compression ratio and large inlet capacity, are required. When the gases are conveyed solely by pumps, the number of pumps required is double the number of separation steps. Even though it is possible by changing the pressure ratio between the spaces for the peripheral portion of the jet stream and the core portion of the jet stream to arrive at conditions more favorable with regard to pump requirements, it was still found, in many instances, that it would be of considerable advantage both as to original plant cost and cost of operating the plant if it were not necessary to rely exclusively on the use of rather costly pumps for conveying the gas mixture to be separated as well as the portions into which it is divided during the separation process.

According to the invention, it was found that for certain applications of the separation system described in application S.N. 563,387, namely, separation of condensible gaseous mixtures, considerable improvement could be attained if the conveyance of the gases or vapors through the separation system is essentially effected by evaporation and condensation procedures. Therefore, for example, in carrying out the present invention the material to be separated is converted into the gaseous phase ahead of the separation system, namely, before entering the nozzle, and then after passing the separation system is recondensed, depending upon the nature of the material, either in the liquid or solid state.

The selection of the materials which can advantageously be processed according to the invention essentially depends upon the vapor pressures such materials possess in the liquid or solid state at the temperature ranges which can be employed. In general, liquid or solid substances come into consideration the equilibrium pressures of which can be adjusted between $10^{-2}$ and $3 \times 10^1$ mm. Hg at temperatures between $-50°$ and $+200°$ C. This temperature range is selected merely with reference to practical ease of technological operation within such range, and basically the process is also operative with substances in which the upper or lower limits of such temperature range is exceeded. As examples of substances which are suitable for the process according to the invention, ethylene glycol can be mentioned for concentrating $C^{13}$ and hydrazine, triazole, biguanide, aniline, its methyl derivatives, orthotoluidine or malonic acid dinitrile for concentrating $N^{15}$.

As already indicated, the process according to the invention can also be used for subliming substances, such as, for example, the concentration of uranium isotopes from uranium hexafluoride.

A modification of the process according to the invention which is especially suited for substances the separation of which must be carried out in a series of steps, is one in which a separating system is connected at times simultaneously to three vessels, one of which serves as evaporator for the solid substance, while the condensation of the separated peripheral and core streams takes place in the other vessels. For the next step, the last named vessels are then operated as evaporators so that the vapor for the next step is produced therein. This modification provides a possibility for combining a plurality of separating systems to provide an apparatus for a multistep separation according to the invention.

The accompanying drawings diagrammatically show several modifications of apparatus suitable for carrying out the process according to the invention.

In the drawings:

Fig. 1b shows a schematic side view of the apparatus shown in Fig. 1a; and

Figure 2B:
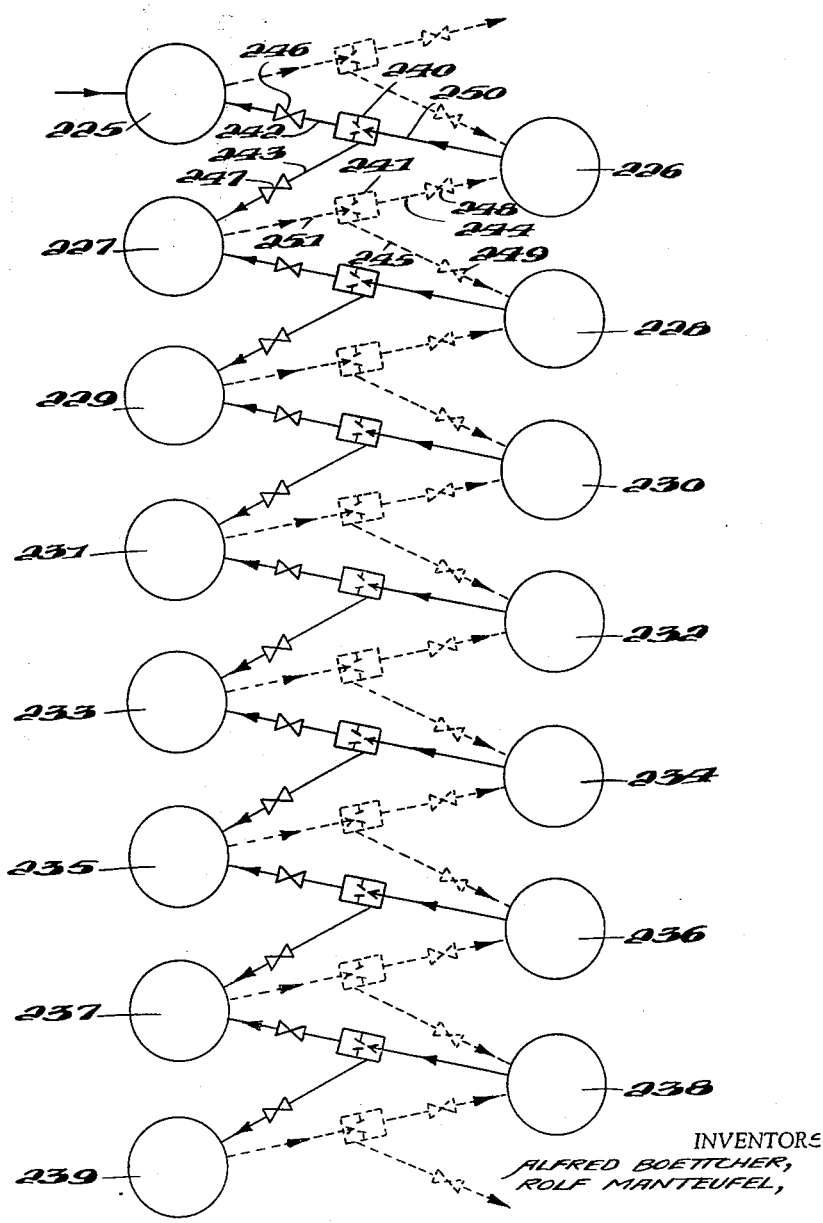

Figs. 2a and 2b diagrammatically show another modification of a separating system according to the invention.

Figure 1B:
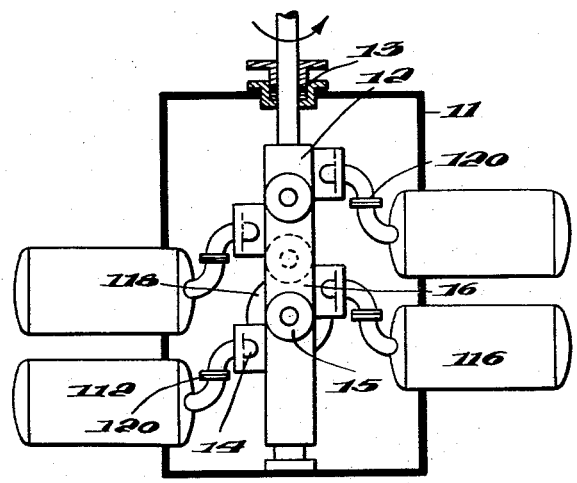
Figure 1A:
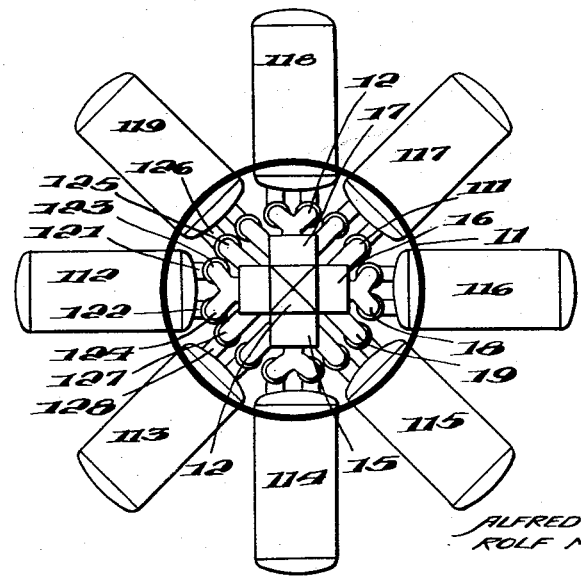
Fig. 1a shows a schematic top view of one modification of the apparatus.

In Figs. 1a and 1b, 11 is a vacuum tight vessel, provided with an axially disposed carrier 12 which is connected to the outside atmosphere through stuffing box seal 13. Carrier 12 holds a plurality of separating elements consisting of a nozzle and an apertured baffle for the separation of the gas stream issuing from the nozzle in the core and peripheral streams. Four of such separating elements are shown in Fig. 1a and are designated as 14, 15, 16 and 17. These separating elements are arranged on a helical line on said carrier 12. Each separating element is provided with a divided supply line, such as 18, for the vapor supplied for separation and two separate discharge lines 19 and 111 for the separate discharge of the separated core and peripheral streams. Every separating element is provided with two, preferably cylindrical, containers 112 and 119 open at one end, which are provided with heating and cooling means (not shown) for the vaporization and condensation of the materials to be separated. The containers are carried by the walls of vacuum vessel 11 in such a way that their open end is within vessel 11 and are distributed around the wall of such vessel with reference to the separating elements on carrier 12 in such a manner that their opening can alternately be connected with the supply lines and the discharge lines of the separating elements.

In order to render it possible to carry out the separation continuously in the arrangement shown, it is necessary that the separating elements alternately be connected with containers 112—119 serving at times as evaporating vessels and as condensing vessels. This requirement can be fulfilled in a simple manner by arranging carrier 12 so that it can be turned together with the separating elements carried thereby about its longitudinal axis in the direction indicated by the curved arrow in Fig. 1b, so that each separating element can be coupled with each condensing and evaporating vessel which lies on the same plane. An easily disengageable coupling between the separating elements and the evaporators and condensers, respectively, can be provided in a number of ways. An especially simple form of such coupling is shown in Figs. 1a and 1b in which the supply and discharge lines of the separating elements on one side and the openings of the evaporators and condensers on the other side are connected in a gas tight manner by horizontally disposed sealing flanges 120 and sealed thereby from the interior of vacuum vessel 11. For proper operation of such gas tight couplings carrier 12 is not only arranged so that it can be rotated about its longitudinal axis but also so that it can be raised and lowered. Then, in order to switch one of the separating elements to the next evaporating or condensing container, the carrier is first raised so that the sealing elements for containers 112—119 are lifted off and after suitable rotation of carrier 12 so that the sealing elements are aligned with the openings of the next containers it is permitted to drop to seal such openings by gravity.

It is of advantage to provide each evaporator or, respectively, condenser vessel 112—119 with two connecting tubes. When, for example, vessels 112, 114, 116 and 118 operate as evaporators, both connecting tubes are connected by divided supply line 18 to the nozzle side of the separating elements, whereas vessels 113, 115, 117 and 119 which are then operating as condensers have each of their two separate discharge lines connected to the baffle side of adjacent separating elements. Of course, all of the connections between the condensers and evaporators with the separating elements must be such as to permit easy detachment.

The multistep separation proceeds as follows in the apparatus described: The material to be separated is in vessel 112, for example, in the solid state. Vessel 112 is connected to separating element 14 over conduits 121 and 122 with inlet lines 123 and 124 through which the vapors produced in vessel 112 by appropriate supply of heat are supplied to the nozzle of separating element 14. The peripheral stream produced by the separation ahead of the baffle is supplied to cooled vessel 119 over conduits 125 and 126 where it is condensed, whereas the separated core portion is supplied to cooled vessel 113 over conduits 127 and 128. After completion of the evaporation and condensation, carrier 12 for the separating elements is lifted to break the connection between the condenser and evaporator vessels and the separating elements, turned 45° in the direction of the curved arrow in Fig. 1b and lowered to establish connection between separating elements 14, 15, 16 and 17 with vessels 113, 115, 117 and 119 which previously operated as condensers. These vessels are then heated so as to operate as evaporators in the next phase of the process, while vessels 112, 114, 116 and 118 in view of their new connections are cooled to act as condensers.

The procedure just described can also be modified, in interest of the optimum mixing relationship of the components to be separated in two consecutive steps, by turning the carrier for the separating elements so that one or more of the vessels are skipped, so that the exchange between condensation and evaporation does not occur in two neighboring vessels.

Also, the spiral-like arrangement of the separating elements and the condensing and evaporating vessels described above is not in any way the only manner in which such elements can be associated. It is, for example, possible to arrange separating elements and vessels in a circular arrangement about each other, however not along a spiral line but in each case in one plane. In such case, an aggregate of one plane must be in communication with one of the aggregates of one of the other planes. Further, one can deviate from the circular type of arrangement which to a certain extent resembles a stator and a rotor and arrange the evaporating or, respectively, the condensing vessels next to each other in a row and provide a movable carrier carrying half the number of separating elements which will permit displacement of the separating elements so that they can be connected to the next vessel or the vessel after the next, or some succeeding vessel which alternately serves for the evaporation and condensation.

While the apparatus shown in Figs. 1a and 1b was constructed to avoid use of any cutoff means in the conduits for material to be separated by employing easily detachable connections and a movable carrier for the separating system. It is also possible in accordance with another modification of the invention to employ an arrangement in which the evaporators, condensers and separating elements are fixed and to regulate the circulation of the vapors and the change between evaporation and condensation with suitable cutoff means, such as valves, cocks, or liquid seals. An arrangement of this nature is, for example, described in Figs. 2a and 2b, in which Fig. 2a, contrary to Figs. 1a and 1b, also shows the combination of the separating apparatus per se with the conduct of the heat exchange medium. Therefore in Fig. 2a two separate cycles are provided, namely, that of the heat exchange medium and that of the material to be separated, the latter of which involves the evaporating and condensing vessels and the separating elements.

The cycle for the heat exchange medium contains two aggregates 21 and 22 as the essential elements, which serve both for the heat exchange and phase reversal and therefore interchangeably operate as evaporators or condensers and the reverse. In the cycle which is represented by continuous lines in Fig. 2a, 21 operates as a condenser for the vapors of the heat exchange medium which are forwarded by compressor 23 over line 24 and valve 25. Upon condensing in tubes 26 of aggregate 21 the heat exchange medium transfers its heat to the surrounding even numbered vessels 226 to 238. The condensed heat exchange medium then reaches supplemental cooler 29 over valve 27 and conduit 28, and from these is supplied to aggregate 22 over conduit 211, decompression valve 212 and conduit 213. The evaporation of the heat exchange medium is effected in tubes 215 in aggregate 22 by transfer of heat from odd numbered vessels 225 to 239 surrounding such tubes 215. The thus vaporized heat exchange medium is then again conveyed to aggregate 21 over valve 216, conduits 217 and 24 and valve 25 by compressor 23. The cycle described can be reversed in that aggregate 21 is operated as the evaporator and aggregate 22 as the condenser so that heat in the vessels is withdrawn by tubes 26 in aggregate 21 and heat is given off over tubes 215 in aggregate 22. The cycle in such instance is represented by the dotted lines in Fig. 2a. In such cycle valves 25, 27, 214 and 216 are closed and compressor conveys the vaporized heat exchange medium over conduit 24 and now open valve 218 and conduit 219 to aggregate 22 and leaves such aggregate in liquid form. The condensed heat exchange medium is then supplied to aggregate 21 over conduit 220, valve 221, supplemental cooler 29, conduit 211, decompression valve 212 and conduit 222. After evaporation of the heat exchange medium in aggregate 21, the resulting vapor is recycled to compressor 23 over valve 223 and conduit 224.

Condensers or, respectively, evaporators 22 and 21 are in direct heat contact with odd numbered vessels 225 to 239 and even numbered vessels 226 to 238 for condensation and evaporation of the material to be separated. Contrary to the modification of apparatus shown in Figs. 1a and 1b in which the number of evaporation and condensing vessels is twice as great as the number of separating elements, the modification shown in Fig. 2a provides only one evaporation or, respectively, condensation vessel for each separating element so that the number of vessels is the same as the number of separating elements. For the sake of simplicity, only two separating elements 240 and 241 are shown in Fig. 2a which are provided with outlet conduits 242, 243, 244 and 245 on the baffle side of such elements, the two outlet conduits of each separating element being connected to adjacent vessels 225 and 227 and respectively 226 and 228. Valves 246, 247, 248 and 249 are provided in such outlet conduits. The inlet conduit to the nozzle side of separating elements 240 is designated 250 and that for element 241 is designated 251.

When the heat exchange medium cycle is as is shown in the continuous lines so that 21 operates as condenser and 22 as evaporator, even numbered vessels 226–238 operate as evaporators. The material evaporated in vessel 226 is passed through separating element 240 over conduit 250 and reaches condensing vessels 225 and 227 over conduits 242 and 243 (valves 246 and 247 being open). In vessels 225 and 227 the heat of condensation is transferred to the evaporating heat exchange medium in tubes 215. The evaporated material in even numbered vessels 228 to 238 reach two neighboring odd numbered vessels 227 to 239 in an analogous manner over the separating elements associated therewith as diagrammatically shown in Fig. 2b. The same reference characters are used in both Figs. 2a and 2b for the elements which are common to both figures. As shown in Fig. 2b, the material evaporated in vessel 226 reaches separating element over conduit 250 and from there reaches vessels 225 and 227 over valved conduits 242 and 243. Analogously, the paths of the material in the remaining vessels follows the following scheme of operation:

For the next stage of the separation, it is necessary to reverse the cycle of the heat exchange medium as has already been described above in that the cycle follows the conduit system represented by the dotted lines so that 22 operates as a condenser and 21 as an evaporator for the heat exchange medium. With such reversed heat exchange medium cycle the function of the vessels for the material to be separated is also reversed and evaporation of such material takes place in odd numbered vessels 225 to 239 so that, for example, the vapor from vessel 227 reaches the nozzle of separating element 241 over conduit 251, and the core portion leaves the separating element over open valve 248 and conduit 244 and is supplied to vessel 226 while the peripheral portion leaves over open valve 249 and conduit 245 and reaches vessel 228. In this stage all even numbered vessels 226 to 238 serve as condensers. As shown in Fig. 2b, the scheme of operation is as follows:

| Evaporation in | 227 | 229 | 231 | 233 | 235 | 237 | 239 |
|---|---|---|---|---|---|---|---|
| Condensation in | 226  228 | 228  230 | 230  232 | 232  234 | 234  236 | 236  238 | 238  240 |

The arrangement just described can of course be modified by introducing a further heat exchange medium between the evaporation or, respectively, condensation vessels for the material to be separated and the heat exchange medium both on the evaporation and condensation side so that the heat transfer is not direct as in the arrangement shown in Fig. 2a but with the assistance of a separate cycle of the second heat exchange medium used.

The arrangement shown in Figs. 1a and 1b can also be combined with a heat exchange cycle such as shown in Fig. 2a.

It is also possible to combine the process of the present invention with that shown in S.N. 563,387 in that a portion of the separation stages can be operated with the aid of pumps and the other portion of the separation stages are operated with the alternate evaporation and condensation described in the present application.

In an apparatus according to Fig. 1 ethylene glycol for instance may be used for the separation of the nitrogen isotopes $N^{14}$ and $N^{15}$, which ethylene glycol shows at a temperature of 10° C. a vapor pressure of 0.01 mm. and at 89.2° C. a such one of 10 mm. For this purpose also ortho toluidine or methyl aniline are usable. An apparatus as shown in Fig. 2 may be used for the separation of the uranium isotopes into uranium hexafluoride.

We claim:

1. In a process for the separation of mixtures of condensible substances in the gaseous state, the atoms or molecules of which possess different kinetic mobilities in the gaseous state in which the gaseous mixture to be separated is passed through a separating system in which it is caused to issue from a nozzle like opening in the form of an expanding jet and the expanding jet is separated into a core portion and a peripheral portion by interposing an apertured baffle in the path of flow of said jet and the peripheral and core portions produced by the separating system are separately collected, the steps which comprise vaporizing the mixture to be separated from a condensed state, passing such vaporized mixture through the separating system and separately condensing the separately collected peripheral and core portions produced by the separation system, said vaporization and condensation being effected with the aid of a heat exchange medium cycle in which the heat exchange medium

| Evaporation in | 226 | 228 | 230 | 232 | 234 | 236 | 238 |
|---|---|---|---|---|---|---|---|
| Condensation in | 225  227 | 227  229 | 229  231 | 231  233 | 233  235 | 235  237 | 237  239 | is vaporized in heat exchange relationship with the condensing core and peripheral portions and condensed in heat exchange relationship with the vaporized mixture to be separated, and the passage of said vaporized mixture through the separating system essentially being effected by said vaporization and said condensation.

2. An apparatus for the separation of condensible mixtures of substances in the gaseous state, the atoms or molecules of which possess different kinetic mobilities in the gaseous state which comprises at least two heat exchange elements operating with a condensible heat exchange medium, said heat exchange elements being alternately operable as condensers and evaporators for such heat exchange medium, conduit means connecting such heat exchange elements for cycling the heat exchange medium through such elements, valve means provided in said conduit means for reversing the direction of flow of such heat exchange medium, at least one vessel disposed in heat exchange relationship with each of such heat exchange elements, the vessel associated with one heat exchange element being connected to the vessel associated with the other heat exchange element through a separating element comprising a chamber, nozzle means having a nozzle like opening for producing an expanding jet opening into such chamber, a baffle arranged within said chamber facing said nozzle like opening to subdivide said chamber, said baffle being provided with an aperture aligned with said nozzle like opening to permit passage of a core portion of an expanding jet issuing from the nozzle like opening to the portion of the chamber behind the baffle while retaining the peripheral portion of the expanding jet ahead of the baffle, outlet means in said chamber ahead of the baffle for withdrawing the retained peripheral portion and outlet means in said chamber behind said baffle for withdrawing the core portion which has passed through the aperture in such baffle, said connection between the vessel associated with one heat exchange element and the vessel associated with the other heat exchange element being through the nozzle like opening and one of the outlets of such separating element, so that condensation of the heat exchange medium and evaporation of the mixture to be separated is effected in one heat exchange element and the vessel associated therewith and evaporation of the heat exchange medium and condensation of gaseous material passed through the separating element is effected in the other heat exchange element and the other vessel associated therewith.

References Cited in the file of this patent

UNITED STATES PATENTS

| | | |
|---|---|---|
| 2,583,601 | Schwertz | Jan. 29, 1952 |
| 2,607,439 | Dickens et al. | Aug. 19, 1952 |

OTHER REFERENCES

R. S. Mulliken: J. American Chemistry Society 45, 1592–1604, 1923.